United States Patent [19]

McCracken et al.

[11] 4,355,365

[45] Oct. 19, 1982

[54] ELECTRONIC INTERMITTER

[75] Inventors: Oliver W. McCracken, Pauls Valley, Okla.; Larry C. Wortham, Garland; Robert S. Higgins, Lewisville, both of Tex.

[73] Assignee: Otis Engineering Corporation, Dallas, Tex.

[21] Appl. No.: 144,069

[22] Filed: Apr. 28, 1980

[51] Int. Cl.[3] .......................... E21B 29/02; G06F 7/38

[52] U.S. Cl. ........................................ 364/569; 166/64; 235/92 T; 235/92 EV; 235/92 MT; 364/422; 364/510

[58] Field of Search ........................ 364/422, 510, 569; 166/53, 64, 65 R, 66; 235/92 T, 92 PE, 92 EV, 92 DE, 92 FL, 92 MT

[56] References Cited

U.S. PATENT DOCUMENTS

| | | | |
|---|---|---|---|
| 3,266,574 | 8/1966 | Gandy | 166/64 |
| 3,691,353 | 9/1972 | Michaud | 235/92 EV |
| 3,824,378 | 7/1974 | Johnson | 235/92 PE |
| 3,909,603 | 9/1975 | Nicolas | 235/92 FL |
| 3,930,142 | 12/1975 | Meier | 235/92 T |
| 4,021,646 | 5/1977 | Meier | 235/92 T |
| 4,084,249 | 4/1978 | Schlick | 235/92 PE |
| 4,101,761 | 7/1978 | Merryman | 235/92 PE |
| 4,150,721 | 4/1979 | Norwood | 166/64 |
| 4,226,284 | 10/1980 | Evans | 166/64 |
| 4,231,104 | 10/1980 | St. Clair | 235/92 PE |

FOREIGN PATENT DOCUMENTS 1418457 12/1975 United Kingdom .

*Primary Examiner*—Errol A. Krass

*Attorney, Agent, or Firm*—H. Mathews Garland

[57] ABSTRACT

A programmable system for controlling the cyclic intermittent operation of a device, such as a flowing gas well. The system comprises battery powered, solid state circuitry including a programmable memory, an up/-down counter and a liquid crystal display for the contents of either the memory or the counter. Programming and control information is introduced into the system through a plurality of touch actuated membrane switches under control of logic circuitry. The memory is first programmed with the desired "on" time and "off" time with which the controlled device is to be cyclicly operated. Once started, the system loads the time for the selected starting condition into the counter, establishes that condition in the device and begins counting down toward zero. When zero is reached, the opposite condition is established in the device, and the time for the duration of that condition is loaded from the memory into the counter which begins the down counting cycle again. The display is used to program times into the memory and to continuously display the time remaining in a cycle.

15 Claims, 9 Drawing Figures

ELECTRONIC INTERMITTER

BACKGROUND OF THE INVENTION (1) Field of the Invention

The invention relates to an electronic intermitter, and, more particularly, to a system for controlling the cyclic, intermittent operation of a device.

(2) History of the Prior Art

There are numerous applications for a system for controlling the intermittent operation of a device, or of another system, which operation requires a high degree of precision in that control. For example, in the "burn in" of certain electronic devices and components, it is desirable to operate the devices for a selected period of time under chosen load and environmental conditions and turn the devices off for another select period of time. By cycling the device through numerous successive "on" and "off" conditions, actual device performance in the field can be simulated to experimentally ascertain the life of the device or its behavior under operating conditions.

Another environment in which intermitter controllers are especially useful is in the control of the flowing gas wells. To produce a flowing gas well in certain geologic formations, it is necessary to employ the practice of periodically "shutting-in" the well. The well is closed off to allow sufficient pressure to build up within the well over a carefully pre-selected period of time so that when the well is subsequently opened up, all the fluids which have built up within the well will be expelled through the sales line system. That is, production of the well occurs only periodically during a relatively short period of time, for example, 15 minutes, while the well remains "shut-in" for a substantially greater period of time, for example, 4 hours. The respective shut-in time and production time which are optimum to produce maximum gas from a given flowing well are unique to each well and each case is determined experimentally. These times are also quite critical. Failure to shut-in a well within even a few minutes of the proper time envelope for that particular well could result in complete loading of the well which may require it to be shut-in for an extended period of time, for example, 48 hours, in order to obtain production again.

Intermittently operated flowing gas wells may sometimes exhibit erratic output pressure characteristics. That is, a well just cycled to the "on" condition characteristically begins to drop in pressure as gas is delivered and continues to drop until "off" cycle begins. Sometimes the pressure may begin to drop and suddenly, due to the flow characteristic of the well, the pressure will rise again for a short time before again beginning its decent. In these instances it would be desirable to place the operation of "on" timing on "pause" 9nd suspend counting during the time period of the burst of increased pressure and extend the production time by an amount equal to the extra gas which happens to be available at that moment. Similarly, if the rising pressure during an "off" cycle takes a sudden dip for a time before it begins its rise toward production pressure again, it is desirable to "pause" in the "off" cycle timing to compensate for the erratic pressure drop.

A prior art system which performs many of the essential functions for intermitting a gas well is shown in U.S. Pat. No. 4,150,721 issued to Norwood. The Norwood system includes a digital read-out and a series of manually actuated thumb wheel switches for selecting the desired "on" and "off" times for intermitting a well. While an improvement over prior art mechanical intermitters the Norwood system still embodies numerous disadvantageous features. For example, the Norwood system requires the on-site presence of an operator to physically reset the mechanical switches to change cycle times rather than being remotely operable as in the system of the present invention. The present system also includes a true programmable memory which may be addressed by small membrane type switches easily mounted in a panel so as to provide a sealed gas tight enclosure. The memory also allows full flexibility in the range of times which may be programmed, i.e., hours/minutes or minutes/seconds.

The intermitter controller of the present invention includes a motor valve failure alarm system wherein the failure of pressure in the output of the controller to said motor valve after a pre-selected period of time results in an alarm condition shutting down the entire controller. The system also has provision for a plurality of external signals which bear upon and indirectly control the desired operational state of the controller. To allow for maximum flexibility in the on and off times of intermitter operation, the system of the invention includes means for changing the timing range to accommodate programmed time in either hours/minutes or in minutes/seconds.

SUMMARY OF THE INVENTION

The system of the present invention is related to a cyclic intermitter. More particularly, the invention comprises a system for cyclicly intermitting the operation of a device between a first state and a second state including a counter, oscillator means for continuously decrementing said counter from a value toward zero, and a programmable memory having a pair of selectively addressable memory locations. The system includes means for storing at a first location in the memory a first time value associated with the duration of the first state and at a second location in the memory a second time value associated with the duration of the second state and gating means for alternately loading said first and second time values from the memory into the counter. The system also includes means responsive to the value in the counter reaching zero for changing the operation of the device from one state to the other and actuating the gating means to load the time value associated with the state to which the device is changed from the memory into the counter.

A further aspect the system of the invention includes an optical display and means for connecting the display to the counter or the memory to selectively display the contents of the counter as the value thereof is changed or the memory contents during operation.

An additional embodiment of the invention includes a system for cyclicaly intermitting the operation of a flowing gas well between an on state and an off state by opening and closing a motor valve, which system comprises a multi-digit counter selectively operable in either an up counting mode for programming or a down counting mode for timing, an oscillator connected to drive the counter at a selected frequency and a programmable memory having a first location for the storage of a numerical time value associated with the desired duration of the on state of the flowing gas well and a second location for the storage of a numerical time value associated with the desired duration of the off state of the flowing gas well. The system also includes means for programming the memory to store a selected first value in the first location and a selected second value in that second location, first gating means for alternately loading the respective time values stored in the first and second memory locations into said counter, and second gating means for establishing a down counting mode in the counter. A third gating means is responsive to the value in the counter reaching zero for changing the state of the motor valve and actuating the first gating means to load the time valve associated with the state to which the motor valve is changed into the counter.

BRIEF DESCRIPTION OF THE DRAWING

The understanding of the present invention and for further objects and advantages thereof, reference may now be had to the following description taken in conjunction with the accompanying drawing in which.

DETAILED DESCRIPTION

Figure 1:
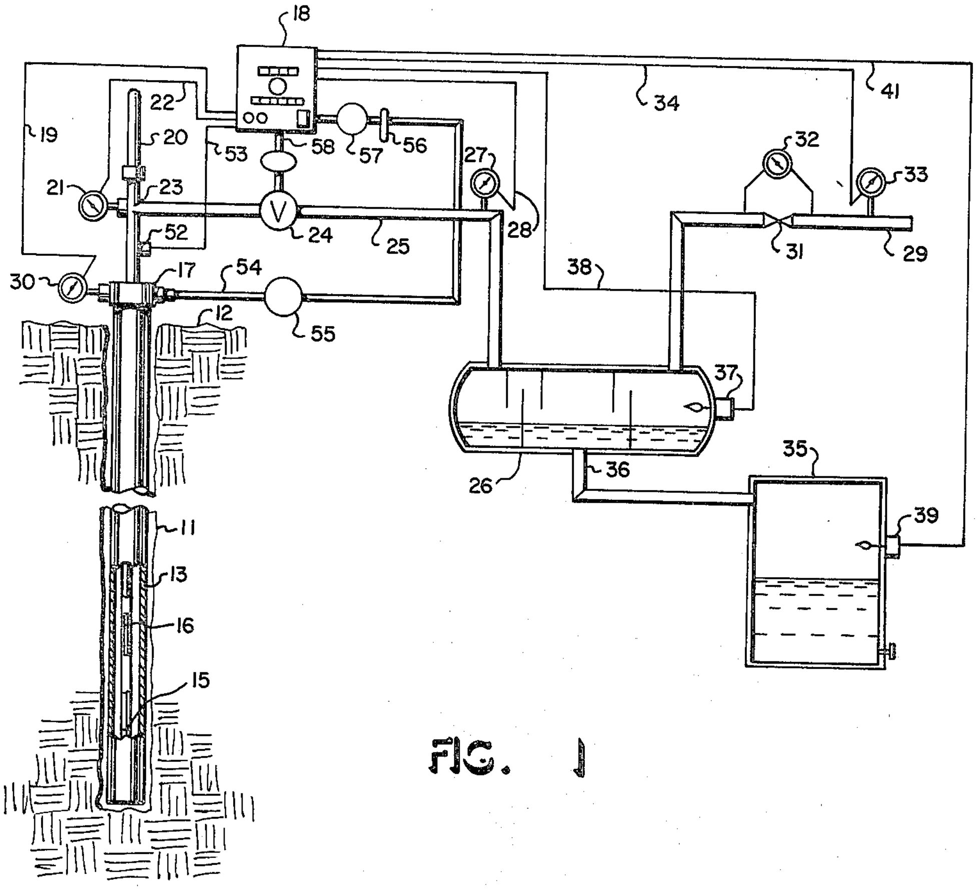
FIG. 1 is an illustrative schematic drawing of a flowing gas well including an intermitter constructed in accordance with the teachings of the present invention.

Referring first to FIG. 1 there is shown an illustrative schematic of a flowing gas well comprising a bore hole 11 extending from the surface of the earth 12. The bore hole is lined by a tubular casing 13 which extends from the surface to the producing geologic strata. The producing strata into which the bore hole and casing extend is formed of porous rock and serves as a pressurized reservoir containing a mixture of gas, oil and water. The casing 13 is preferably perforated along the region of the bore hole containing the producing strata in order to allow fluid communication between the strata and the well. A string of tubing 14 extends axially down the casing 13 and is terminated in a bumper spring and tubing stop 15. A plunger 16 is positioned within the tubing and is prevented from passing out the lower end of the tubing by the tubing stop 15. Both tubing and casing extend into the bore hole from a well head 17 located on the surface above the well which also provides support for the string of tubing 14 extending into the casing. The casing gas pressure is monitored by a gauge 30, which includes internal limit switches preset at a selected value and connected to the intermitter controller 18 via leads 19. The upper end of the tubing 14 is enclosed by a lubricator 20 which receives the plunger 16 when it is in its uppermost position. The tubing gas pressure is measured by a gauge 21 which also includes preset limit switches connected to the controller 18 by leads 22.

The tubing string 14 is connected to a flow tee 23 which leads through a motor valve 24 to an outlet conduit 25 connected to a liquid gas separator 26. The output line pressure 25 is monitored by a flow line gauge 27 which also includes preset limit switches coupled to the controller 18 over leads 28. An output sales line 29 is connected from the output of the separator 26. The sales line 29 includes a restricted orifice 31 across which is connected a flow meter 32 for monitoring the volume of flow through the sales line. The flow meter 32 may also include preset limit switches. The sales line output pressure is monitored by a gauge 33 which includes high and low limit switches connected to the controller 18 over leads 34. The liquid collected within the separator 26 is communicated to a liquid storage tank through conduit 36. The liquid level in the separator 26 is monitored by a level indicator 37 connected to the controller 18 over leads 38 while the level of the liquid storage tank 35 is monitored by an indicator 39 connected to controller 18 over leads 41.

In operation of the flowing gas well of FIG. 1, the motor valve 24 is closed for a preselected period of time ("off" time) during which the gas pressure within the casing 13 gradually rises while liquid such as oil and salt water also seep into the bore hole and gradually accummulates and rises in level within the casing 13. After a predetermined period of time the gas pressure within the casing will have risen to a selected value and the accummulated liquid will have risen to a selected level both of which are consistent with the maximum production parameters of the well. The motor valve 24 is then opened and the plunger 16 is propelled to the top of the tubing string 14 into the lubricator 20 by virtue of the sudden rush of gas which propels the accummulated liquid and the plunger 16 up the tubing through the tee connection 23, through motor valve 24 and out the conduit 25 into the separator 26. The separator 26 functions conventionally to separate the majority of the production gas from oil and water so that the gas is directed out the sales line 29 and the water and oil mixture is removed from the separator through the conduit 36 into the storage tank 35.

The tubing 14 has located immediately below the flow tee 23, a plunger arrival trip mechanism 52 which signals the proximity of the plunger 16 to the controller 18 over leads 53. A pneumatic control gas supply conduit 54 is connected from the well lead 17 and passes through a high pressure regulator 55, a filter 56 and a low pressure regulator 57 into the intermitter controller 18. This regulated and filtered natural gas is used to supply the pneumatic operation pressure necessary to open and close the motor valve 24. The pneumatic pressure is delivered to the motor valve 24 over control line 58 from "on" and "off" solenoid valves located in the controller 18.

After a period of production flow from the well, the gas flow rate will have decreased to the point it is desirable to "shut in" the well. The motor valve 24 is then closed to allow the pressure to rebuild within the casing for a preselected period of time. The function of the intermitter controller 18 is to open the motor valve 24 and monitor the preselected time during which it is desired to leave it open and then close the motor valve 24 for the preselected time the well is to be "shut in". That is, the intermitter controller 18 varies the intermittent "on" and "off" operation of the producing gas well system of FIG. 1.

Figure 2:
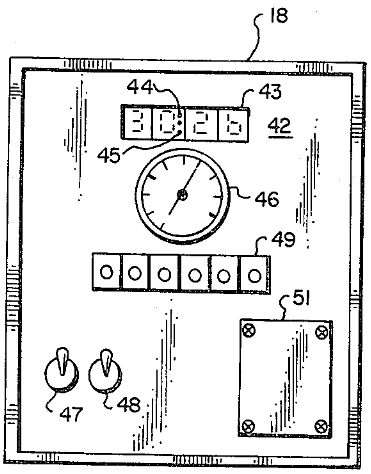
FIG. 2 is an illustrative front view of the display panel of the intermitter controller of the present invention.

Referring now to FIG. 2, we see an illustrative front view of the control panel of the intermitter controller 18. The panel includes a flat face plate 42 into which is mounted a four digit liquid crystal display 43. In addition to the four digits, the display 43 includes a provision for a colon display 44 and a decimal point display 45. Natural gas pressure from the flowing well is first regulated and then used to provide the pneumatic force to open and close the motor valve 24 (FIG. 1). A pressure gauge 46 is included and may be used to monitor either line pressure or regulated supply pressure. Manipulation of the three-way toggle valve 48 select the function of the gauge 46. The two-way toggle valve 47 shuts-off the supply pressure to the solenoid valve, thereby shutting off the controller. The panel 42 also mounts an array of six touch actuated membrane type switches 49 which are used to program and operate the intermitter controller 18. Behind cover plate 51 are located a plurality of D size batteries locally available which are the sole operating power for the intermitter controller 18. As can be seen from the FIG. 2, the arrangement of components of the face of the controller is such to provide complete sealing of the instrument case and, thus, a totally gas tight enclosure.

Figure 3:
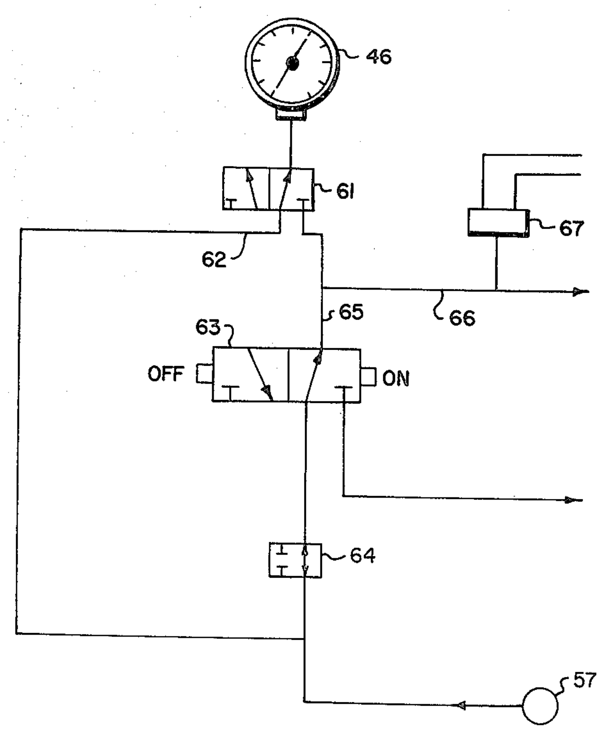
FIG. 3 is an illustrative schematic diagram of a gauge reading selector valve system used in conjunction with the present invention.

Referring now to FIG. 3, there is shown the switching arrangement by which the gauge 46 is used to monitor both supply pressure and output pressure from the pneumatic actuation system. A supply of gas from the regulator 57 at about 25 to 30 psi is connected to a three-way gauge reading selector toggle valve 61 via line 62. The regulator supply line is also connected to solenoid valve 63 through a two-way toggle valve 64. The output of the solenoid valve 63 is connected to the gauge reading selector valve 61 over line 65. An output line 66 also includes a normally closed pressure switch 67 which is connected back to the controller 18 for monitoring the output pressure from the solenoid valve. As can be seen, when the two-way toggle valve 64 is in the blocking position and the gauge reading selector valve 61 is the left most position, as shown, solenoid valve 63 is not operative and the pressure gauge 46 reads the supply pressure. With the on-off toggle valve 64 in the flowing position, the gauge 46 still reads the supply pressure when the selector valve 61 is in the left most position. However, when the valve 61 is shifted to the right most position, it can be seen that the gauge 46 will then read the line pressure output of pneumatic supply line 66.

Figure 4:
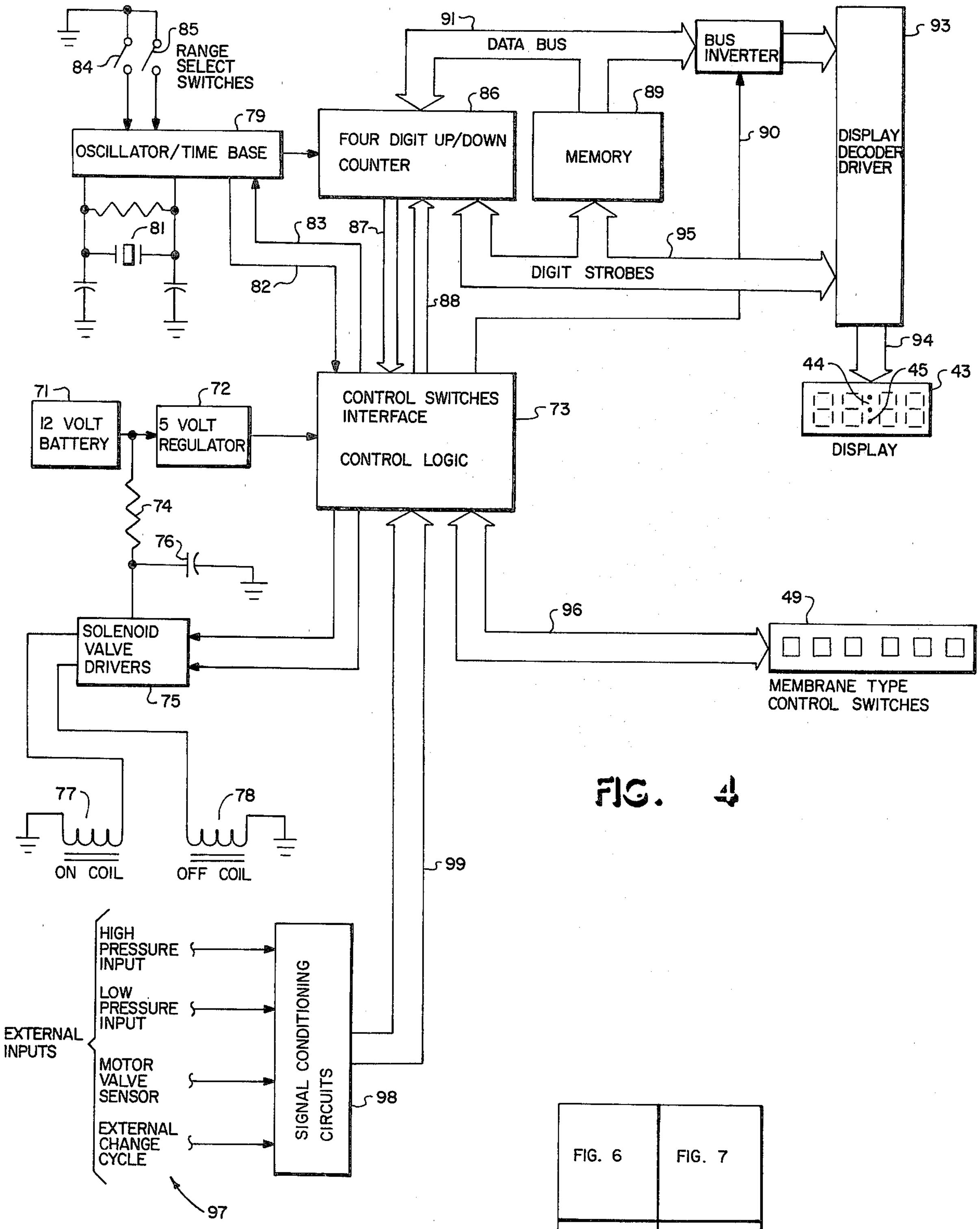
FIG. 4 is a block diagram of the intermitter controller of the present invention.

Referring now to FIG. 4, we see a block diagram of an electronic intermitter system constructed in accordance with the present invention. A 12 volt battery supply 71 is connected through a conventional five volt regulator 27 to supply power to all of the electronics including the module 73 representing the control logic and the interface with the control switches 49. The 12 volt battery supply 71 is also connected through a current limiting resistor 74 to solenoid valve driver circuits 75 across which is connected a storage/dump capacitor 76. The solenoid valve drivers 75 selectively deliver a burst of supply current to either an "on" coil 77 or an "off" coil 78. Energization of the "on" coil 77 supplies control gas pressure to operate and, in this embodiment, open the motor valve 24 (FIG. 1) while energization of the "off" coil 78 also supplies control gas pressure to change the position of, and in this embodiment, close the motor valve. An oscillator/time base 79 is controlled by a crystal 81 to supply oscillation and timing signals to and from the control logic 73 over paths 82 and 83. A pair of range select switches 84 and 85 are used to select the range of time for both the on and off cycles. That is, either an hours/minutes range or a minutes/seconds range may be selected for both the "on" time and the "off" time cycles under control of the intermitter 18. The oscillator/time base 79 is also connected to a four digit up/down counter 86 which communicates with the control logic 73 over lines 87 and 88. The counter 86 may be selectively connected to either transmit or receive data information from a programmable memory 89 via a data bus 91. The bus 91 is also connected thru a selectively operated bus inverter 92, to a display decoder/driver 93. The inverter 92 is only required for displaying information directly from the memory 89, not from the counter 86, and is controlled by the logic 73 over line 90. The decoder/driver 93 controls the four digit display 43 over bus 94. Counter 86, memory 89 and display decoder/driver 93 are additionally interconnected with one another for clocking data back and forth by means of a digit strobe bus 95. The array of membrane type control switches 49 is connected to the control switch interface and control logic 73 over a data bus 96. The system of FIG. 4 also makes provision for a plurality of external inputs 97 which are coupled through signal conditioning circuit 98 to the control logic 73 over data bus 99.

By means of the control switches 49, a "on" time, selected in either hours/minutes or minutes/seconds, may be programmed into the memory 89 via the control logic 73 such that a preselected value of "on" time is stored in the memory. Similarily, a preselected "off" time, also in either hours/minutes or minutes/seconds, may be programmed into the memory 89 via the control logic 73. On time programming is done by touching a program switch on the array 49 and then touching an "on" time switch to increment the counter 86 until the desired on time is shown in the display. The counter 86 is connected to the memory 89 during the procedure and the desired time is automatically stored. Similarly, off time programming is also done by touching the program switch and then touching the "off" time switch to increment the counter 86 until the desired off time is shown in the display. Upon completion of programming, the stop/load switch is depressed and either on time or off time is initially selected via a "change cycle" switch, and, upon depression of a start switch on the array 49, the system establishes the initially selected state and begins timing. This is done by loading the "on" time information, (for example), from the memory 89 into the counter 86 and then counting down to 0. When the count reaches 0, the control logic 73 sends a signal to the solenoid valve drivers 75 to change the state of the motor valve to off. The "off" time information is then loaded from the memory 89 into the counter 86 and the countdown is begun for the "off" cycle. When the count reaches 0, the control logic sends a signal to the solenoid valve drivers 75 to change the state of the motor valve to on and the cycle repeated. The information in the counter 86 is continuously shown on the display 43 as the countdown proceeds.

The depression of a change cycles switch in the array 49 causes the intermitter immediately to switch from whatever state it was in at that moment to the opposite state and reload the counter with the time associated with that state. Similarily, depression of a stop switch in the array 49 causes the system to stop counting without altering the state of the cycle. Other inputs such as high and low pressure limit switches and a motor valve condition sensing switch are included in the array 97 and are similarily entered into the control logic 73 over the bus 99 so that these external parameters are considered by the control logic 73 during operation. For example, if no control pressure is present after the passage of 32 seconds following a signal, failure of the motor valve control results in an immediate shut down of the entire system and an alarm condition.

Figure 5:
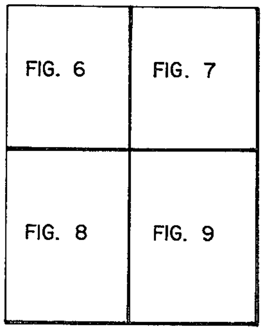
FIG. 5 is an illustration of the manner in which FIGS. 6, 7, 8 and 9 should be arranged for viewing.
Figure 6:
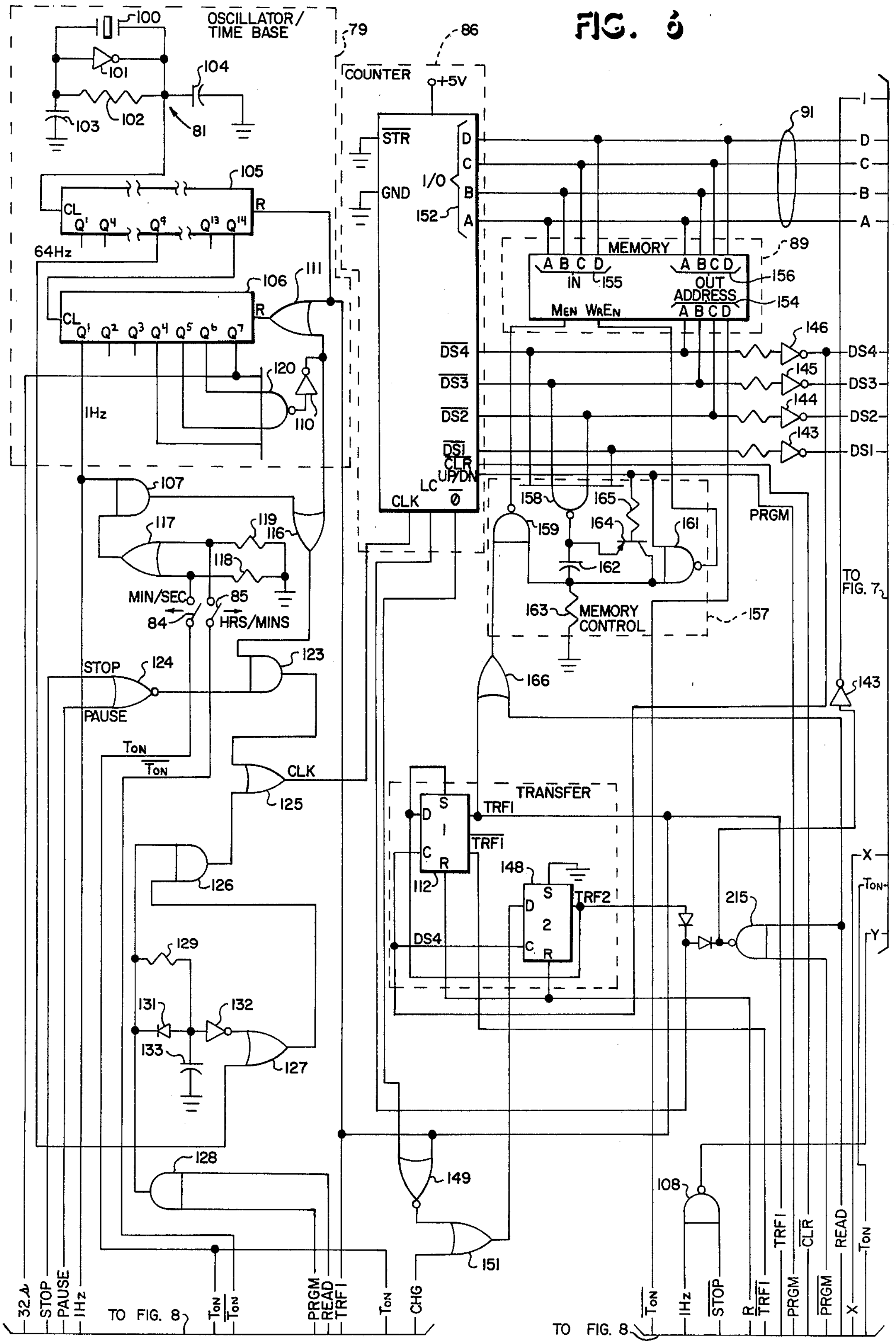
FIGS. 6, 7, 8 and 9 are each portions of a logic diagram of an intermitter controller constructed in accordance with the present invention.

Referring next to FIG. 5, there is shown an illustration of the manner in which FIGS. 6, 7, 8 and 9 should be arranged to show a schematic diagram of the electronic intermitter controller system of the invention shown in block diagram in FIG. 4. Referring first to FIG. 6, the oscillator/time base 79 includes a crystal controlled oscillator 81 comprising a crystal 100 connected across an inverting amplifier 101 and a feedback resistor 103. A capacitor 103 is connected from the input of the amplifier 101 to ground while a capacitor 104 is connected from the amplifier output to ground. The output of the crystal controlled/oscillator 81 is connected to the clock input of a first ripple counter 105. The output frequency of the oscillator 81 is preferably on the order of 32.768 KHz which produces a 64 Hz signal on the $Q^9$ output of the ripple counter 105. The $Q^{19}$ output of the counter 105 is connected to the clock input of a second ripple counter 106. The counter 105 may comprise an RCA model 4020 counter while the counter 106 may comprise an RCA model CD4024 counter. The $Q^1$ output signal of the counter 106 has a frequency of 1 Hz and is connected to one input of an AND gate 107, to one input of NAND gate 108 and to one input of AND gate 109. The $Q^4$, $Q^5$, $Q^6$ and $Q^7$ outputs of the counter 106 are each connected to a four input NAND gate 120. The output of the NAND gate 120 is connected thru an inverter 110 to one input of an OR gate 111, the output which is connected to the reset input of the counter 106. The other input of the OR gate 111 is connected to the reset input of counter 105, from the TRF1 lead of the transfer 1 flip flop 112, the on-off flip flop 113, and pause control flip flops 114 and 115. The output of the inverter 110 is also connected to one input of OR gate 116, the other input of which is connected from the output of AND gate 107. The other input of AND gate 107 is connected from an OR gate 117 having one input connected across a resistor 118 to a first range selector switch 84 and the other input connected across a resistor 119 to a second range selector switch 85. The other side of range selector switch 84 is connected to the $T_{on}$ lead extending from on-off flip flop 113, pause control flip flop 114, on-off monitor flip flop 121 and to the solenoid driver system 75. The other side of range selector switch 85 is connected to the $T_{on}$ lead extending from on-off flip flop 113, pause control flip flop 114, on-off monitor flip flop 121 and the solenoid driver system 75. If the selector swith 84 is left in the open position, the "on" time of the intermitter will be indicated in hours and minutes on the display 43 and if the switch 84 is closed, the "on" time of the intermitter will be indicated in minutes and seconds. Similarly, when the range selector switch 85 is open, the "off" time of the intermitter is indicated in hours and minutes, while if switch 85 is closed, the "off" time of the system is indicated in minutes and seconds. The output of OR gate 116 is connected to one input of an AND gate 123, the other input of which is connected from the output of a NOR gate 124. The output of the AND gate 123 is connected to one input of an OR gate 125, the other input of which is connected from the output of AND gate 126, whose inputs are connected respectively from the outputs of OR gate 127 and AND gate 128. One input of the AND gate 128 is connected to the PRGM lead while the other is connected to the READ lead.

The output of the AND gate 128 is connected through a resistor 129 and a diode 131 to the input of an inverter 132 the output which is connected to the input of OR gate 127 the other input of which is connected to the 64 Hz signal from $Q^9$ of counter 105. A timing capacitor 133 is connected across the input of the inverter 132. The output of the OR gate 125 forms the CLK lead which is connected to the clock input of the counter 86 to supply pulses thereto at one of three selected rates, either 1 Hz, 1 per minute or 64 Hz, as will be explained below. One input of the NOR gate 124 is connected from the PAUSE lead from OR gate 134, included within the PAUSE control system 135, while the other input of NOR gate 124 is the STOP lead from the STOP flip flop 136.

When the oscillator 81 is running at 32.768 KHz, the $Q^9$ output of counter 105 produces a 64 Hz signal while the $Q^{14}$ output produces a 0.5 Hz signal. The $Q^1$ output of the counter 106 produces a 1 Hz signal while the outputs on leads $Q^4$, $Q^5$, $Q^6$ and $Q^7$ into NAND gate 120 produce an output signal at the end of 60 Hz which is coupled through the inverter 110 and the OR gate 111 to reset the counter 106. Thus, a signal having a frequency of one cycle per minute (0.0166 Hz) is applied to one of the inputs of OR gate 116. When the PRGM lead is high, one of the inputs of AND gate 128 is energized. When the READ lead is high, the other input to the AND gate 128 is energized. The PRGM lead goes high whenever the program switch 195 of the array 49 is actuated to operate the program relay 137 and prepare the system to clock-in "on" or "off" time information by incrementing the counter 86. The READ lead is high whenever either the on switch 193 or the off switch 194 in the array 49 is actuated. The output of AND gate 128 is high only when both PRGM and READ are high. When the output of gate 128 is high, a signal having a frequency of 64 Hz is coupled from the CLK lead of OR gate 125 to the CLK input of the counter 86, after the time delay of the RC circuit 129/133. That is, periodically touching the on button or the off button increments the CLK high lead of the counter 86 one unit (minutes or seconds) per touch. If, however, the READ lead is held actuated for greater than one second (by holding the on or off switch depressed), the RC circuit comprising resistor 129 and capacitor 133 times out to place an output signal through inverter 132 and apply the 64 Hz signal through OR gate 127, AND gate 126 and OR gate 125 to clock the counter at a 64 Hz rate. The decay time of the RC circuit comprising resistor 129 and capacitor 133 is approximately one second so that if during programming, if it is desired to increment the counter one unit at a time, it can be done by intermittent touches of either the up or the down switch as desired. If, however, it is desired to increment the counter more rapidly, the depression of either the on or off switch for greater than one second, will cause the counter to increment at a rate of 64 Hz. If a signal is present on either the STOP lead or the PAUSE lead connected to the respective inputs of NOR gate 124, the output of AND gate 123 is disabled so that no clock pulses are delivered to the counter 86 from the oscillator/time base 79.

The four leads A, B, C and D of the binary coded decimal input/output port 152 of the counter 86 are connected to the A, B, C and D input 155 of the memory 89 over data bus 91. The particular memory 89 used herein may comprise a model 74C89 sixty four bit memory as manufactured by National Semiconducter Corporation. One of the idiosyncrasies of this memory 89 is that the output of the memory is inverted, i.e., $\bar{A}\,\bar{B}\,\bar{C}\,\bar{D}$. When information is being fed directly from the memory 89 to the display decoder/driver 93 for display, the information must be first passed through a bus inverter 92. If, however, information is being transferred directly from the output port 152 of the counter 86 to the display decoder/driver 93, the bus inverter 92 is disabled. The four binary coded decimal leads A B C D are connected from the I/O port 152 of counter 86 to both the input 155 and the output 156 of the memory 89 via data bus 91 and to the input of display decoder/driver 93 via the bus inverter 92. The bus inverter 92 comprises four exclusive OR gates 138, 139, 141 and 142. One input of each of the exclusive OR gates is connected through an inverter 143 to the output of NAND gate 215. When the system is timing the decreasing contents of the counter 86 is shown directly on the display 43. During timing, the READ lead will be low which will place a high at the output of NAND gate 125 which causes the output of inverter 143 to be low and disable each of the OR gates 138–142. Thus, the bus inverter 92 is disabled and non-inverting, when information is fed directly from the counter 86 to the display decoder/-driver 93. However, during timing operation, when the counter 86 is being decremented as aforedescribed, and the "on" time or "off" time switch are actuated, the output 156 of the memory 89 is coupled to the display decoder/driver 193 through the bus inverter 92 since the READ lead is high and the output of inverter 143 high.

During all operational functions of the system other than programming, and when the "on" or "off" cycle switch are actuated during counting, the READ lead remains low and the bus inverter 92 is disabled to transfer data directly from the output 152 of the counter 86 to the display decoder/driver 193. The counter 86 also includes four digit strobe leads $\overline{DS1}$, $\overline{DS2}$, $\overline{DS3}$, and $\overline{DS4}$ which are connected respectively through inverters 143, 144, 145 and 146 to the digit strobe inputs DS1, DS2, DS3 and DS4 of the display decoder/driver 93. Thus, information is strobed into and out of the counter 86. The counter 86 also has a $\overline{CLR}$ input with which the contents of the counter are cleared, an UP/DN input governing whether the counter increments or decrements, and an LC lead which controls the loading of the counter 86 from the memory 89. The LC lead is connected to the TRF2 lead of the transfer 2 flip flop 148. The $\bar{0}$ output of the counter 86 is connected to one input of a NOR gate 149, the output of which is connected through an OR gate 151 to the data input of the transfer 2 flip flop 148. The other input of the NOR gate 149 is connected to the TRF1 lead from the on-off flip flop 113 and from the transfer 1 flip flop 112. The $\bar{0}$ output of the counter 86 produces a signal indication whenever the counter reaches 0 following a down counting operation.

The counter 86 has a trilevel input in that the LC (load command) input may be high (+5 V), low, (Ov) or intermediate (+2.5 v). The LC input of the counter 86 normally sits at the intermediate level. When the LC lead is pulled high, the data present at the BCD I/O port 152 is loaded into the counter 86. When the LC lead is pulled low, the counter 86 continues to count and function in the normal manner but the output port 152 is disabled so that the contents of the counter are no longer displayed. This feature of the counter, allows the data bus 91 to be freed up from displaying the contents of the counter so it may be used to display data from the memory while the counter continues counting, or for some other purpose. Depending upon the closure of switches 84 and 85 the CLK input to the counter 86 is either one input per minute or one input per second.

When the counter is counting down from a programmed time and reaches zero, the $\bar{0}$ lead goes low to take low one input of the NOR gate 149. The other input of NOR gate 149, the TRF1 lead, is already low to produce an output signal thru NOR gate 151 to enable the transfer 2 flip flop 148 so that upon the subsequent occurrence of a DS4 digit strobe signal, the transfer 2 flip flop 148 will be clocked high. Setting of the transfer 2 flip flop takes the TRF2 lead high which in turn sets the transfer 1 flip flop 112 to take the TRF1 lead high. When TRF2 goes high, that signal is applied to the LC lead of the counter 86 and data is loaded from the memory 89 onto the counter 86. A signal on the PRGM lead or the EMG lead connected thru OR gate 153 will disable the transfer 1 and transfer 2 flip flops in either program or emergency states. Whenever the TRF2 lead from the transfer 2 flip flop 148 goes high, the output of NOR gate 149 is switched low to remove the signal from the data input of the transfer 2 relay so that upon the subsequent occurrence of a DS4 digit strobe pulse the transfer 2 148 relay will be reset. Resetting of the transfer 2 relay 148 removes the high from the data input of the transfer 1 relay 112 so that it is then reset upon the next occurrence of a DS4 digit strobe pulse. When the TRF2 lead goes low, the $\bar{0}$ lead is clocked high again preventing a recurring transfer cycle.

The memory 89 functions so that when the memory enable lead, $\overline{M_{en}}$, and the write enable load $\overline{W_rE_n}$, are pulled low and an address given to the memory via the four bit address input 154, the memory stores at that address the data which appears at the memory input port 155. The memory 89 is read by switching $M_{en}$ low while leaving $\overline{W_rE_n}$ high with an address over leads 154. An inverted output $\bar{A}\,\bar{B}\,\bar{C}\,\bar{D}$ is produced at output leads 156. The memory 189 is addressed via the digit strobe signals on leads $\overline{DS2}$, $\overline{DS3}$, $\overline{DS4}$ and by means of the $T_{on}$ signal. Memory control is provided between each of the digit strobe signals from the counter by means of the control circuit 157. The circuit comprises a four input NAND gate 158 having its four inputs connected respectively to the $\overline{DS4}$, $\overline{DS3}$, $\overline{DS2}$ and $\overline{DS1}$ leads from the counter 86. The output of the NAND gate 158 is at times capacitively coupled to the inputs of NAND gates 159 and 161 through a capacitor 162 and a resistor 163 and at times l.c. coupled through a transistor 164. The base lead of the transistor 164 is coupled through a resistor 165 to the PRGM lead, also connected to the UP/DN input of the counter. The PRGM lead is also connected to the other input of NAND gate 161 while the other input of NAND gate 159 is connected to the output of the transfer 1 flip flop 112 through an OR gate 166, the other input of which is connected to the READ lead. The function of memory control circuitry 157 is to provide $M_{en}$ and $W_rE_n$ signals in the form of very short pulses during transfer cycles and full width $\overline{M_{en}}$ pulses during memory display functions.

Figure 7:
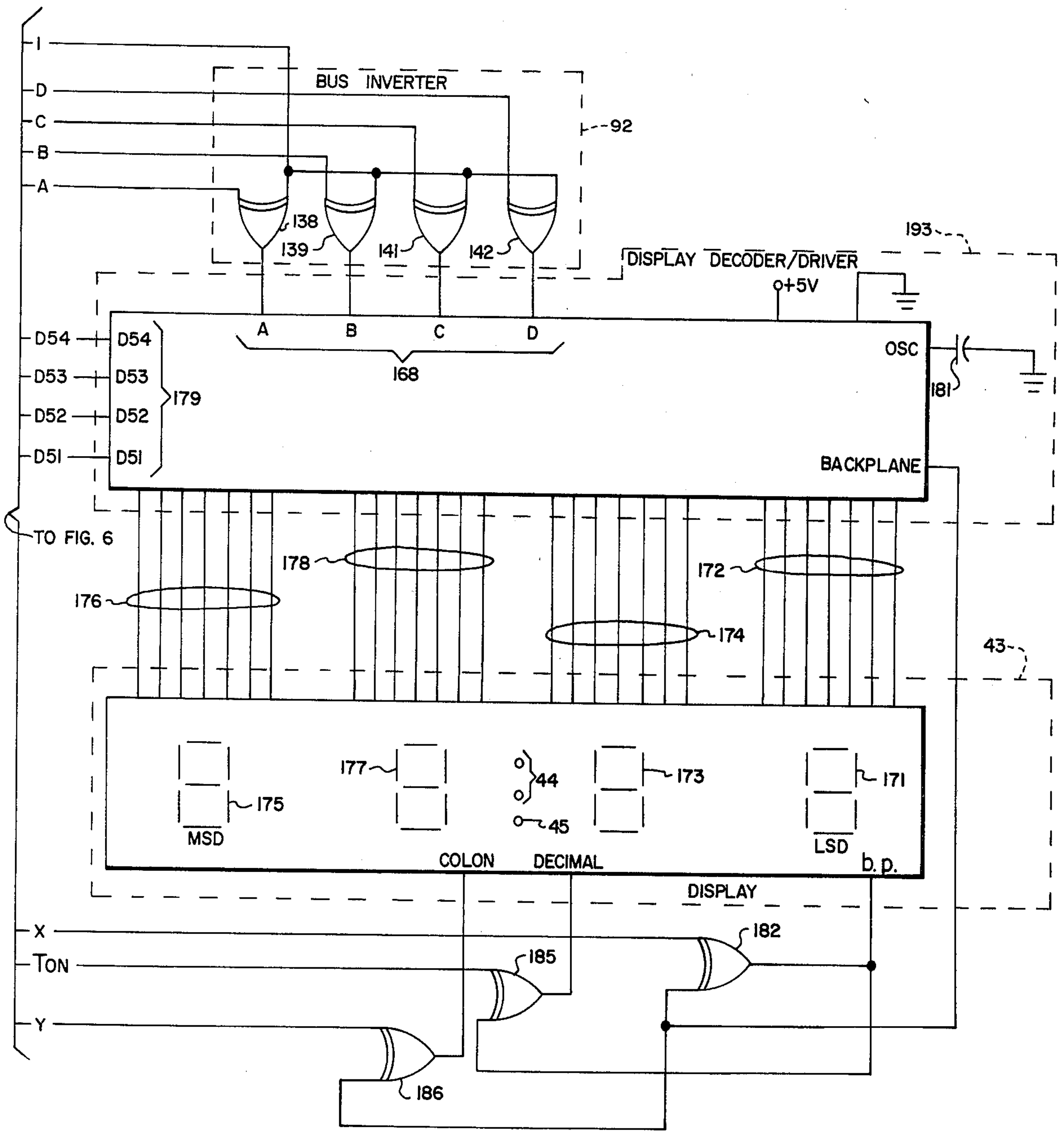
Figure 8:
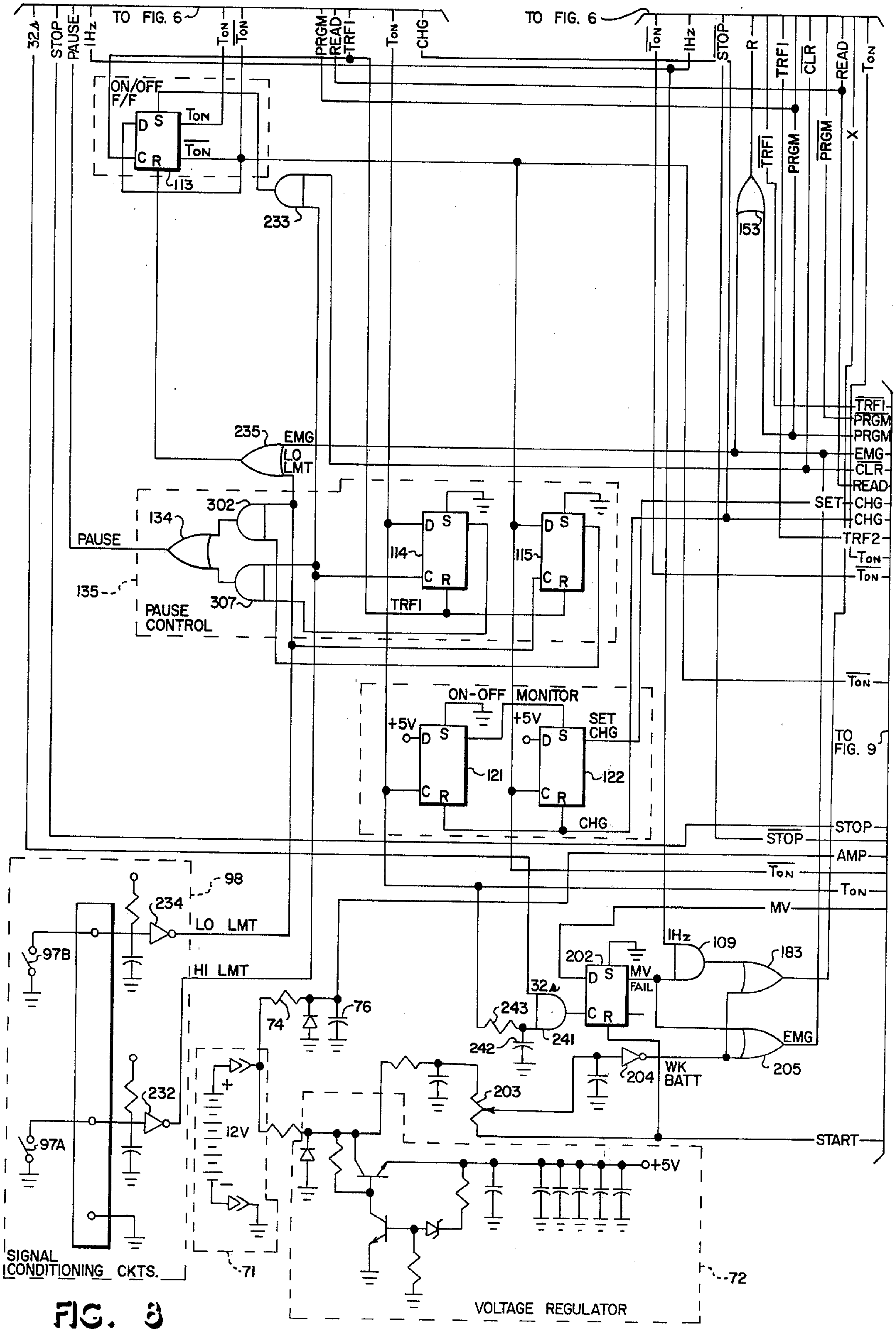

Referring to FIG. 7, the display decoder/driver 193 is a BCD to seven segment liquid crystal display driver. A model 7211IPL decoder/driver as manufactured by Intersill Corporation works satisfactorily. The display decoder/driver/93 receives input in a BCD format over data bus 91 connected to a four bit input port 168. Data for the least significant digit 171 of the display 43 is carried over a seven line bus 172. The segment data information for the next more significant digit 173, is carried over a seven line bus 174. Data for the most significant digit 175 is carried over a bus 176 while data for the next most significant digit 177 is transmitted over bus 178. The display decoder/driver 193 also includes digit strobe input 179 for digit strobe signals DS1, DS2, DS3 and DS4 so that information is strobed between the data input 168 and the busses 172, 174, 176 and 178 in the proper sequence. The display decoder/driver contains its own back plane oscillator, fine tuned by capacitor 181. A back plane oscillation signal is connected from driver 193 to one input of an exclusive OR gate 182 the other input of which is connected as the X lead from an OR gate 183 (FIG. 8) associated with an emergency such as a motor valve failure. Thus, an output signal from exclusive OR gate 182 applies a signal to the b.p. input of the display 43 to invert the phase of the back plane frequency so that all of the digits of the display are blinked on and off simultaneously indicating an emergency condition such as motor valve control failure or low battery. The output of the exclusive OR gate 185 is connected to illuminate and blink the decimal point 45 at the backplane oscillator frequency when the system is in the "on" time cycle. One input of the exclusive OR gate 185 is connected from the output of the exclusive OR gate 182 while the other is connected to the $T_{on}$ lead. The output of the exclusive OR gate 186 is connected to illuminate the colon 44 and has one input connected from the backplane oscillator frequency and the other input connected from the output of NAND gate 108 so that the colon 44 blinks at a 1 Hz rate on all conditions unless the system is in a $\overline{STOP}$ condition, in which case the colon 44 will be constantly illuminated. NAND gate 108 is actuated by a 1 Hz signal from the oscillator time base 79 on one lead and a $\overline{STOP}$ signal on the other. A signal from NAND gate 108 on the Y lead drives the input of exclusive OR gate 186 controlling the colon function.

Figure 9:
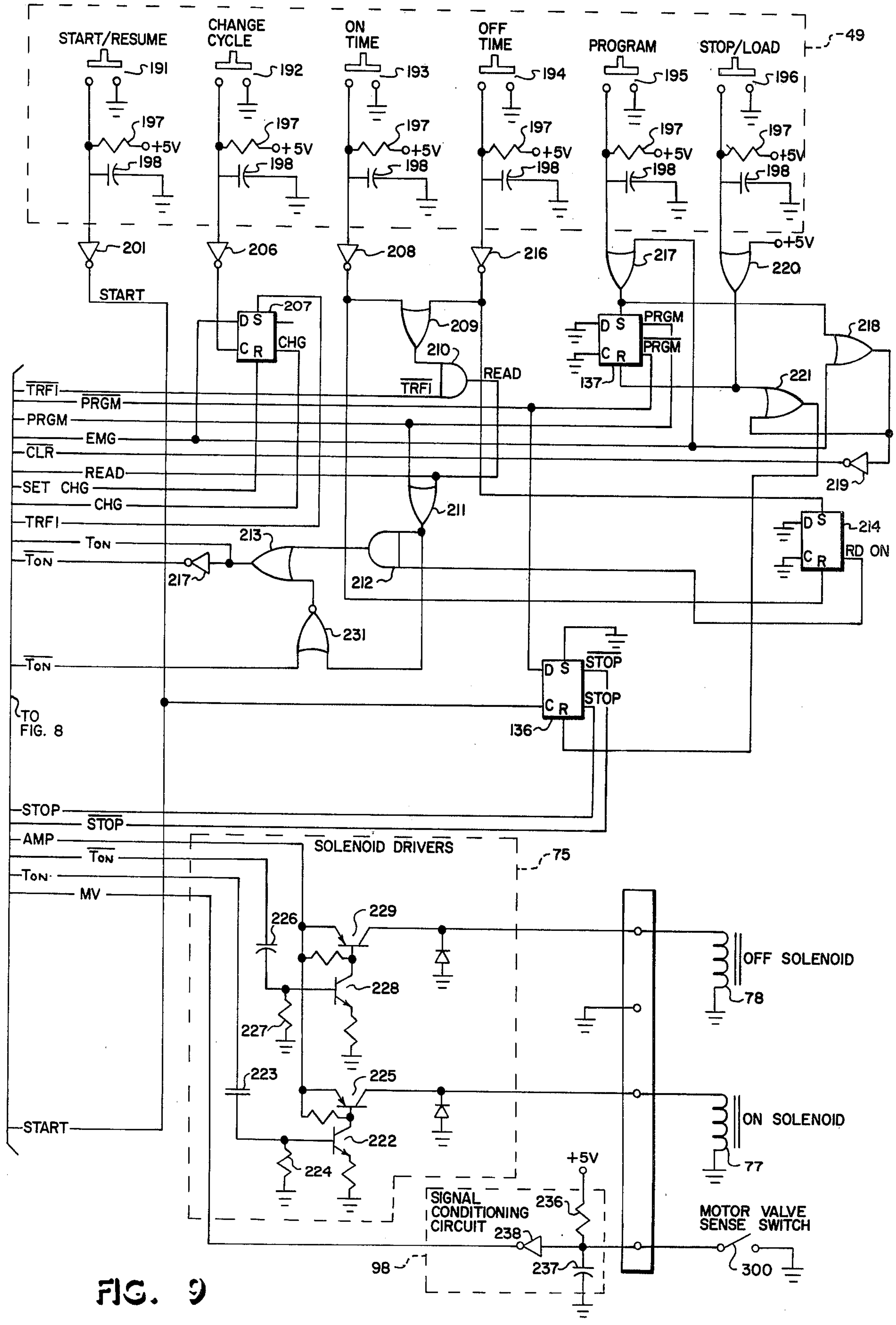

Referring now to the membrane type touch control switches 49 of FIG. 9, the left-most switch is a start-/resume switch 191, the next switch to the right is a change/cycle switch 192, the next is an "on" time switch 193, next an "off" time switch 194, next a program switch 195 and the right-most a stop/load switch 196. Each of the switches is connected to the positive 5 volt source through a resistor 197 and to ground through a capacitor 198. The start/resume switch 191 is also connected to the input of an inverter 201 the output of which is the START lead connected to the clock input of the STOP flip flop 136, the reset input of a motor valve failure flip flop 202, and to one side of a variable potentiometer 203. When the system is stopped, a low signal applied from the switch 191 to the input of the inverter 201 produces a high signal at the clock input of the STOP flip flop 136 to produce a high on the STOP and a low on the $\overline{STOP}$ lead. The high on the output of the inverter 201, the START lead, is applied to the reset input of the motor valve control failure relay flip flop 202 so that the flip flop is reset in the event the system had previously stopped as a result of motor valve control failure which locked up the relay 202. The potentiometer 203 is the trip level adjustment for the weak battery indication so that when a high is applied to the START lead it will also extinguish the weak battery indication at the output of the inverter 204, in the event the system had stopped for that reason.

A low on either input of OR gate 205, from the motor valve control failure flip flop 202 or the low battery inverter 204, produces a high on the EMG lead output of OR gate, and stops the system and produces an emergency display condition.

Depression of the change cycle switch 192 takes the input of inverter 206 low so that its output goes high and clocks a change flip flop 207. The data input of the change flip flop 207 is connected to the EMG lead so that operation of the change flip flop 207 is disabled in the event the system is in an emergency condition. However, if emergency does not exist, a high signal on the clock lead to change flip flop 207 produces a high on the CHG lead which is connected to one input of the OR gate 151 (FIG. 6) and to the reset input of the on/-off monitor flip flops 121 and 122. The CHG signal applied to the input of OR gate 151 operates the transfer 2 relay flip flop 148 and the transfer 1 flip flop 112 to affect a change from an on cycle to an off cycle or vice versa. The high on the CHG lead also resets the on/off monitor flip flops 121 and 122 back low if they had been high.

Closure of the "on" time switch 193 places a low on the input to inverter 208 whose output is connected to one input of an OR gate 209, the output of which is connected to one input of an AND gate 210. The output of the AND gate 110 is the READ lead which is coupled to one input of an OR gate 211 whose output is connected to one input of an AND gate 212. The output of the AND gate 212 is connected to an OR gate 213 to produce a $T_{on}$ signal when that output is high and a $\overline{T_{on}}$ signal to the D lead of memory address port 154 when that output is low. A low signal at the input of inverter 208 also produces a high signal at one input of the AND gate 210 via OR gate 209. If the system is not in a transfer mode, that is if the TRF1 lead is high, a high READ signal is coupled through the OR gate 211 to the input of the AND gate 212 so in the event the other input of the AND gate 212 is also high (due to the set of flip flop 214), a high signal is coupled onto the $T_{on}$ lead which illuminates the decimal 45 on the display 43 via exclusive OR gate 185. A high signal on the READ lead from AND gate 210 is also coupled to the READ input of AND gate 128, to one input of a NAND gate 215, and through an inverter 143 as the I lead to bus inverter 92. When the system is in a timing operation and the "on" time switch is actuated, the I lead is high, the bus inverter 92 is enabled to permit the direct display of data from the memory 89 on the display 43. When the system is in programming mode and the "on" time switch is actuated, the I lead is low to disable the inverter 92 and display data directly from the counter 86. When the $T_{on}$ signal is high it is inverted by inverter 217 to produce a low on the $\overline{T_{on}}$ and hence a 0 on the "D" address of the digit grouping 154 of the memory 89, to address the first location in the memory associated with a numerical "on" time value.

Depression of the "off" time switch 194 places a low at the input of inverter 216 so that a high is coupled to the input of OR gate 209 to also produce a high on the READ lead as an output from the AND gate 210. The high at the output of inverter 216 also sets the flip flop 214 so that the output thereof, applied to one input of the AND gate 212, is low. Therefore, the low output of AND gate 212 applied to the input of OR gate 213 produces a low on the $T_{on}$ lead and, through the inverter 217 a high on the $\overline{T_{on}}$. When the $\overline{T_{on}}$ signal is high, a 1 is applied to the "D" address of the digit grouping 154 of memory 89 to address the second location in the memory associated with a numerical "off" time valve. A high on the READ lead is coupled through inverter 143 to produce a high on the I lead and enable the bus inverter 92 so that the output of the memory 89 is shown directly on the display 43. When the system is in programming mode and the "off" time switch is actuated, that I lead is low to disable the inverter 92 and display data directly from the counter 86.

The output of the program switch 195 is connected on one input of a NOR gate 217 the other input of which is connected to the EMG lead. The output of the NOR gate 217 is connected to one input of an OR gate 218 whose output is connected through an inverter 219 as the CLR lead. The output of the NOR gate 217 is also connected to the set input of a program flip-flop 137. The $\overline{PRGM}$ lead output of the flip flop 137 is connected to one input of the OR gate 211; one input of the OR gate 153; one input of the AND gate 128; the UP/DN input of the counter 86; the resistor 165 and one input of the NAND gate 161. The PRGM output of the program flip flop 137 is connected to the data input of the STOP flip flop 136 and to one input of a NAND gate 215. The other input of the NAND gate 217 comes from the EMG lead so that if there is an emergency state no programming can be done. The flip flop 214 is a READ ON flip flop which is set by actuation of the "off" switch 194 and reset by actuation of the "on" switch 193. Thus, the system may be programmed in either the "on" cycle or the "off" cycle as desired by pressing the appropriate switch. In programming, it will be noted that once the program switch 195 is pressed, either the "on" time cycle or "off" time cycle may be addressed. The "on" time is addressed by depressing switch 193 and resetting the flip flop 124 thereby producing a high output on the $T_{on}$ lead illuminating the decimal 45 and addressing the appropriate section of the memory 89 by virtue of the "0" signal (low) on the D lead of the memory address 154. The "off" time cycle is addressed by depressing switch 194 to set the flip flop 214 so that a high is produced on the $\overline{T_{on}}$ lead and a "1" (high) signal applied to the "D" lead of memory address 154 to address the other section of the memory 89 and provide no illumination of the decimal 45.

PROGRAMMING

In programming of the system the range selector switches 84 and 85 are set as desired for the respective "on" and "off" times. A given value is loaded into the counter 86 and the memory 89 as follows: depression of the program switch 195 sets the STOP flip flop 136 and places a high on the PGRM lead which switches the UP/DN lead of the counter 86 so that the counter will increment. Assuming "on" time is to be programmed first, each time the "on" time switch 193 is depressed, a high signal will be applied to OR gate 209 and AND gate 210 to produce a high at the output of the READ lead which together with the high on the PRGM lead, produces a high at the output of AND gate 128 (FIG. 6). The high on the output of AND gate 128 is applied to one input of the AND gate 126 the other input of which has a high from the output of OR gate 127 so that a high is applied to one input of the clock OR gate 125 which increments the CLK lead of the counter one increment per depression of the "on" time switch 193. The high on the $T_{on}$ lead applies a low ("0") to the "D" input of address 154 of the memory 89 and the value in the counter 86 is simultaneously loaded into the "on" time section of the memory 89. If it is desired to increment the counter more rapidly than 1 increment per touch of the "on" time switch 193, the switch is depressed continuously. After the output of AND gate 128 is high for over 1 second, the decay time of RC combination 129/133, a 64 Hz signal is applied through OR gate 127, AND gate 126 and CLK OR gate 125 to increment the counter and memory at 64 increments per second.

When the "on" time is programmed, the "off" time switch 194 is then depressed to produce a high on the $\overline{T_{on}}$ lead and apply a high ("1") to the "D" input of address 154 of the memory 89 to load the value of "off" time into the "off" time section of memory 89. Each time the "off" time switch 194 is touched the counter 86 and memory 89 are simultaneously incremented. If it is desired to increment the counter 86 more rapidly than 1 increment per touch, the switch 194 is depressed continuously for over 1 second and the counter is incremented at the rate of 64 Hz as described below.

MANUAL CHANGE CYCLES

Time values on "on" time as well as time values for "off" time have been loaded into the appropriate sections of the memory 89. In order to start intermitter timing operation of the system, it must be determined whether to begin with "on" time cycle or an "off" time cycle. Assuming the "off" cycle was present when last programmed, and it is desired to begin operation with the "on" cycle, depression of the change cycle switch 192 produces a high output on the CNG lead from the change relay to one input of OR gate 151 to initiate a change in state in the transfer 2 relay 148 and the transfer 1 relay 112 to change from the "off" cycle to the "on" cycle, and load the counter 86 with the programmed data stored in the memory corresponding to the "on" cycle time. In a transfer operation, the transfer relays 148 and 112 produce a signal TRF1 via OR gate 166 thru NAND gate 159 to pull the memory enable $\overline{M_{en}}$ low so that data is strobed out of terminals 156 of the memory 89, into terminals 152 the counter with the occurrence with each of the digit strobe signals DS1–DS4. The counter 186 includes its own internal oscillator which provides the strobe signals in the sequential order of digit strobes DS4, DS3, DS2 and DS1 as the counter is operating. Once the data is loaded into the counter 86 the transfer flip flops 112 and 148 are reset. The UP/DN lead of the counter is normally low so that, except when programming, so that the counter normally counts down from a value.

CYCLE TIMING AND AUTOMATIC CYCLE CHANGE

Once the desired cycle time is loaded into the counter 86, the start/resume switch 191 is depressed which resets the STOP flip flop 136 and the counter starts counting downward from the pre set value of time towards 0. When the counter reaches 0 a low signal occurs on the $\overline{0}$ lead of the counter 186 which is communicated via the NOR gate 149 and the OR gate 151 to perform another transfer operation and change the state of the transfer 2 relay 148 and the transfer 1 relay 112. The high on the TRF1 lead is connected to the clock input of the on/off flip flop 113 to change its state. The Ton output of the on/off flip flop 113 is connected to the base of a transistor of 222 via a coupling capacitor 223 and a shunt resistor 224. A high input on the $T_{on}$ lead is coupled thru the transistor 222 to turn on a transistor 225 which provides a current path for the on solenoid 77 and operates that solenoid. The on solenoid 77 supplies pressure to operate the motor valve 24 (FIG. 1). Conversely, a high signal on the $\overline{T_{on}}$ lead of the on/off flip flop 113 is coupled thru a capacitor 226 and resistor 227 to the base of a transistor 228 which is connected to the base of a transistor 229. When the $\overline{Ton}$ lead is high, transistor 229 provides a current path for the off solenoid 78 which closes the motor valve 24 (FIG. 1). Thus, the moment that the on/off flip flop 113 switches from one state to another it simultaneously switches the solenoids 77 and 78 to the desired state.

Both the solenoid driver transistors 229 and 225 have their emitters connected to a +12 volt source and switch in a period on the order of 50 milliseconds to power the solenoids. Shortly after switching, affected capacitor 223 or 226 returns to a fully charged condition to restabalize the actuated driver.

At the end of the "on" time cycle and upon switching of the transfer 2 flip flop 148 so that TRF2 is in a high state, the LC lead of the counter 86 goes high so that the counter is septible to reloading with stored data from the memory 89 corresponding to the "off" cycle time. A high signal on the $\overline{T_{on}}$ lead from the on/off flip flop 113 is connected to one input of the NOR gate 231 which produces a low to the input of OR gate 213. The high at the output of inverter 217 illuminates the "decimal 45", via exclusive OR gate 185, and places a "1" on the "D" lead of address 154 so that the proper section of the memory 189 is then addressed and "off" cycle time loaded out of the memory into the counter 86 via the I/O port 152. The "off" cycle time data from the memory 89 is loaded into the counter 86 in synchronism with the occurrence of strobe signal from the internal oscillator of the counter 86. As the data is being strobed from the memory 89 into the counter 86, digit strobe signals are also being applied to the inputs of the four input NOR gate 158. The transfer 2 and transfer 1 flip flops 148 and 112 are reset again with the second and third occurrences of the DS4 digit strobe signal, respectively. (The first DS4 digit strobe pulse sets flip flops 112 and 148 for the load counter operation).

The transfer 1 and transfer 2 flip flops 148 and 112 are only on for the brief time period of transition between the end of one count and the loading of information into the counter to begin a second count. The transfer flip flops are strobed off immediately after the loading of the information to await a subsequent countdown and a resetting operation. The transfer 1 flip flop 112 operates subsequently to the transfer 2 flip flop 148 in resetting so that a high on the TRF1 lead will hold the NOR gate 149 operated until the loading of data has been completed. Upon the occurrence of the second DS4 digit strobe pulse following loading, the transfer 2 flip flop 148 is reset which enables the resetting of the transfer 1 flip flop 112 on the subsequent third occurrence of a DS4 digit strobe pulse.

STOP

The output of the stop/load switch 196 is connected to one input of an exclusive OR gate 220, having the other input connected to a positive 5 volts, to function as an inverter. The output of the exclusive OR gate 220 is connected to one input of an OR gate 221 the other input of which is connected from the output of OR gate 218. The output of OR gate 221 is connected to the reset input of STOP flip flop 136. A high on the output of the exclusive OR gate 220 will reset the program flip flop 137, to produce a high on the $\overline{PRGM}$ lead, as well as pass through OR gate 221 set the STOP flip flop 136 since $\overline{PRGM}$ is high. The setting of the STOP flip flop 136 provides a high on the STOP lead which is applied to the input of NOR gate 124 to inhibit the passage of signals from the time base to the clock input of the counter 86 and stop the system from further operation.

EXTERNAL SIGNAL OVERRIDE

Assuming that the system is in operation on the "off" cycle and an event such as closure of a switch 97A, which for example, could indicate adequate casing pressure, passes through a high limit inverter 232 to an AND gate 233 in the form of a Hi LMT signal. As long as a $\overline{CLR}$ signal is present, that is, there is no STOP or programming in effect, the signal will pass through the AND gate 233 to set the on/off flip flop 113 and produce a high on $\overline{T_{on}}$ and switch the system "on". Similarily, the occurrence of a low limit condition is connected from switch 97B through the inverter 234 to one input of an OR gate 235. If there is a high signal on the EMG lead, indicating emergency condition or from the inverter 234, the on/off flip flop 113 is reset by the output of the OR gate 235 to turn the system "off."

PAUSE CONTROL

The output of the high limit inverter 232 is connected to one input of AND gate 301 of pause control flip flop 114. The output of the low limit inverter 234 is connected to one input of an AND gate 302 the other input of which is connected to the output of pause control flip flop 115. If a Hi LIM signal occurs after the system has entered an "on" cycle, the pause condition will dwell for as long as that Hi LIM signal is present in the on cycle. If a Lo LIM signal occurs after the system has entered an "off" cycle, the pause condition will dwell for as long as that Lo LIM signal is present in the "off" cycle.

When the $\overline{T_{on}}$ signal is high, pause control flip flop 114 is clocked high upon the occurrence of a Hi LIM signal. A high is produced at the output of AND gate 301 in response to the Hi LIM signal and the high output of pause control flip flop 114, which is coupled out as a high pause signal through OR gate 134 to interrupt the decrementing counter 86. The "pause" interruption continues until the cessation of the Hi LIM signal. When the $\overline{T_{on}}$ signal is high, pause control flip flop 115 is clocked high upon the occurrence of a Lo LMT signal. A high is produced at the output of AND gate 302 in response to the Lo LIM signal and the high output of pause control flip flop 115, which is coupled through OR gate 134 as a high PAUSE signal.

MOTOR VALVE FAILURE

Motor valve sense switch 300 is connected to signal condition circuit 98 which includes resistor 236, capacitor 237 and inverter 238. The function of this circuit is to clean up the output signal from switch 300 so that a very clean input signal is provided to the electronics of the system. The motor valve sense switch 300 comprises a normally closed pressure switch monitoring the controller output pressure so that if within 32 seconds of the "on" solenoid being energized, there is no opening of the switch 300 due to a controller output pressure increase, the switch 300 closed places a high signal on the data input of the motor valve failure flip flop 202. The outer input of the AND gate 241 is connected to the $T_{on}$ lead through capacitor 242 and a resistor 243.

After the occurrence of 32 seconds, following the beginning of an "on" time cycle, a signal is applied to the input of AND gate 241 to clock the motor valve failure relay 202. The motor valve control failure signal is coupled from the flip flop 202 to one input of an AND gate 109 the other input of which is connected to a 1 second signal from the Q1 output of the counter 106. A high signal from AND gate 109 is coupled thru OR gate 183 to energize exclusive OR gate 182 to alternately invert and not invert the backplane cycle frequency at a one cycle per second rate and cause the display 43 to flash on and off in an emergency indication. The motor valve control failure relay 202 will only be reset by the depression of the start switch 191.

It should be noted that both the control switches 49 and the combination of the display and display decoder/driver unit may be located at a remote location and data supplied to and received from the control of elements of the system by means of transmission lines. That is, the 12 leads connecting the circuitry of FIG. 7 to the rest of the system and the switch output leads of FIG. 9 could remotely program, operate and monitor the system. Thus, a plurality of intermitters could be set up to function under control of a central computing facility or a central dispatching facility by means of the fully flexible electronic controls of the present intermitter.

It is thus believed that the operation and construction of the present invention will be apparent from the foregoing description. While the method and apparatus shown and described has been characterized as being preferred it will be obvious that various changes and modifications may be made therein without departing from the spirit and scope of the invention as defined in the following claims.

We claim:

1. A system for cyclicly intermitting the operation of a device between a first state and a second state, comprising:

- a counter;
- oscillator means for continuously decrementing said counter from a value toward zero;
- a programmable memory having a pair of selectively addressable memory locations;
- means for storing at a first location in said memory a first time value associated with the duration of said first state and at a second location in said memory a second time value associated with the duration of said second state;
- gating means for automatically alternately loading said first and second time values from said memory into said counter; and
- automatic sequencing means responsive to the value in said counter reaching zero for automatically changing the operation of the device from one state to the other and actuating said gating means to automatically load the time value associated with the state to which the device is changed from said memory into said counter.

2. A system for cyclicy intermitting the operation of a device between a first state and a second state, as set forth in claim 1 which also includes:

- an optical display; and
- means for connecting said display to said counter to display the contents of said counter as the value thereof is changed.

3. A system for cyclicly intermitting the operation of a device between a first state and a second state as set forth in claim 2 wherein said optical display includes means for indicating the state of the device and which also includes:

- gating means responsive to the state of the device for energizing said indicating means.

4. A system for cyclicly intermitting the operation of a device between a first state and a second state as set forth in claim 1 which also includes:

- a change cycle switch;
- means responsive to actuation of said change cycle switch for changing the operation of the device from one state to the other and actuating said gating means to load the time value associated with the state to which the device is changed from said memory into said counter.

5. A system for cyclicly intermitting the operation of a device between a first state and a second state as set forth in claim 1 which also includes:

- a stop switch;
- means responsive to actuation of said stop switch for interrupting said oscillator.

6. A system for cyclicly intermitting the operation of a device between a first state and a second state as set forth in claim 1 which also includes:

- means responsive to a failure of the device to change states of operation for interrupting said oscillator.

7. A system for cyclicly intermitting the operation of a device between a first state and a second state, comprising:

- a bidirectional counter;
- oscillator means for continuously decrementing said counter from a value toward zero;
- an optical display;
- means for connecting said display to said counter to display the contents of said counter as the value thereof is changed;
- a programmable memory having a pair of selectively addressable memory locations;
- means for storing at a first location in said memory a first time value associated with the duration of said first state and at a second location in said memory a second time value associated with the duration of said second state, said storing means including:
  - a programming switch;
  - a first state switch;
  - a second state switch;
  - gating means responsive to actuation of said programming switch for placing said counter in the incrementing mode, clearing the contents of said counter and interrupting said oscillator means;
  - means responsive to both said programming switch being actuated and actuation of said first state switch for connecting the first location in said memory to continuously receive and store the contents of said counter;
  - means responsive to actuation of said first state switch for incrementing said counter;
  - means responsive to both said programming switch being actuated and actuation of said second state switch for connecting the second location in said memory to continuously receive and store the contents of said counter; and
  - means responsive to actuation of said second state switch for incrementing said counter;
- gating means for alternately loading said first and second time values from said memory into said counter; and
- means responsive to the value in said counter reaching zero for changing the operation of the device from one state to the other and actuating said gating means to load the time value associated with the state to which the device is changed from said memory into said counter.

8. A system for cyclicly intermitting the operation of a device between a first state and a second state as set forth in claim 7 wherein each of said switches are of the touch actuated membrane type.

9. A system for cyclicly intermitting the operation of a device between a first state and a second state, comprising:

a bidirectional counter;

oscillator means for continuously decrementing said counter from a value toward zero;

an optical display;

means for connecting said display to said counter to display the contents of said counter as the value thereof is changed;

a programmable memory having a pair of selectively addressable memory locations;

means for storing at a first location in said memory a first time value associated with the duration of said first state and at a second location in said memory a second time value associated with the duration of said second state, said storing means including:

a programming switch;

a first state switch;

a second state switch;

gating means responsive to actuation of said programming switch for placing said counter in the incrementing mode, clearing the contents of said counter and interrupting said oscillator means;

means responsive to both said programming switch being actuated and actuation of said first state switch for connecting the first location in said memory to continuously receive and store the contents of said counter;

means responsive to actuation of said first state switch for incrementing said counter;

means responsive to both said programming switch being actuated and actuation of said second state switch for connecting the second location in said memory to continuously receive and store the contents of said counter; and means responsive to actuation of said second state switch for incrementing said counter;

gating means for alternately loading said first and second time values from said memory into said counter; and means responsive to the value in said counter reaching zero for changing the operation of the device from one state to the other and actuating said gating means to load the time value associated with the state to which the device is changed from said memory into said counter;

a start switch; and means responsive to actuation of both said start switch and either said first state switch or said second state switch for placing said counter in the decrementing mode, loading the time value from the corresponding location in the memory into said counter and disabling said oscillator interrupting means.

10. A system for cyclicly intermitting the operation of a device between a first state and a second state, comprising:

a bidirectional counter;

oscillator means for continuously decrementing said counter from a value toward zero;

an optical display;

means for connecting said display to said counter to display the contents of said counter as the value thereof is changed;

a programmable memory having a pair of selectively addressable memory locations;

means for storing at a first location in said memory a first time value associated with the duration of said first state and at a second location in said memory a second time value associated with the duration of said second state, said storing means including:

a programming switch;

a first state switch;

a second state switch;

gating means responsive to actuation of said programming switch for placing said counter in the incrementing mode, clearing the contents of said counter and interrupting said oscillator means;

means responsive to both said programming switch being actuated and actuation of said first state switch for connecting the first location in said memory to continuously receive and store the contents of said counter;

means responsive to actuation of said first state switch for incrementing said counter;

means responsive to both said programming switch being actuated and actuation of said second state switch for connecting the second location in said memory to continuously receive and store the contents of said counter; and means reponsive to actuation of said second state switch for incrementing said counter;

said means responsive to actuation of said first state switch for incrementing said counter and said means responsive to actuation of said second state switch for incrementing said counter each comprising:

a second oscillator means running at a selected frequency;

means responsive to each actuation of said switches for incrementing the counter by one unit; and means responsive to holding said switches actuated for a preselected minimum period of time for connecting said second oscillator to said counter and incrementing said counter at said selected frequency;

gating means for alternately loading said first and second time values from said memory into said counter; and means responsive to the value in said counter reaching zero for changing the operation of the device from one state to the other and actuating said gating means to load the time value associated with the state to which the device is changed from said memory into said counter.

11. A system for cyclicly intermitting the operation of a flowing gas well between an on state and an off state by opening and closing a motor valve, said system comprising:

a multi-digit counter selectively operable in either an up counting mode or a down counting mode;

an oscillator connected to drive said counter at a selected frequency;

a programmable memory having a first location for the storage of a numerical time value associated with the desired duration of the on state of said flowing gas well and a second location for the storage of a numerical time value associated with the desired duration of the off state of said flowing gas well;

means for programming said memory to store a selected first value in said first location and a selected second value in said second location;

first gating means for alternately loading the respective time values stored in said first and second memory locations into said counter;

second gating means for establishing a down counting mode in said counter; and third gating means responsive to the value in said counter reaching zero for changing the state of said motor valve and actuating said first gating means to load the time value associated with the state to which the motor valve is changed into the counter.

12. A system for cyclicly intermitting the operation of a flowing gas well between an on state and an off state by opening and closing a motor valve as set forth in claim 11 which also includes:

a multi-digit optical display; and means for selectively connecting said display to either said counter or said memory to display the numerical values therein as those values change.

13. A system for cyclicly intermitting the operation of a flowing gas well between an on state and an off state by opening and closing a motor valve as set forth in claim 12 wherein said programming means comprises:

a touch actuated programming switch;

a touch actuated on state switch;

a touch activated off state switch;

fourth gating means responsive to actuation of said programming switch for disabling said second gating means and interrupting said oscillator;

means operable following actuation of said programming switch and responsive to actuation of said on state switch for clearing the contents of said counter and for connecting the first location of said memory to said counter and to said optical display to continuously receive, store and display the contents of said counter;

means responsive to actuation of said on state switch for incrementing said counter until the selected first numerical time value associated with the desired duration of the on state of said motor valve appears in said display;

means operable following actuation of said programming switch and responsive to actuation of said off state switch for clearing the contents of said counter and for connecting the second location of said memory to said counter and to said optical display to continuously receive, store and display the contents of said counter; and means responsive to actuation of said off state switch for incrementing said counter until the selected second numerical time value associated with the desired duration of the off state of said motor valve appears in said display.

14. A system for cyclicly intermitting the operation of a flowing gas well between an on state and an off state by opening and closing a motor valve as set forth in claim 11 which also includes:

pressure responsive means connected to monitor the motor valve control gas pressure; and means responsive to failure to said output gas pressure to change values consistent with a corresponding change in states of the motor valve for interrupting said oscillator and producing an optical signal indicative of said failure.

15. A system for cyclicly intermitting the operation of a flowing gas well between an on state and an off state by opening and closing a motor valve as set forth in claim 11 which also includes:

pressure responsive means connected to monitor the gas pressure from the well casing, said pressure responsive means producing a high limit signal and a low limit signal in response to the output pressure reaching preselected high and low values;

means responsive to the presence of an on state of said motor valve and the successive occurrence of the cessation of high limit signal followed by the production of a high limit signal for interrupting said oscillator until the high limit signal again ceases; and means responsive to the presence of an off state of said motor valve and the successive occurrence of the cessation the low limit signal follows by the production of a low limit signal for interrupting said oscillator until the low limit signal again ceases.

* * * * *